United States Patent [19]

Billington

[11] 4,234,992

[45] Nov. 25, 1980

[54] CLEANING APPARATUS

[75] Inventor: William P. Billington, Flitwick, England

[73] Assignee: National Research Development Corporation, London, England

[21] Appl. No.: 947,174

[22] Filed: Sep. 28, 1978

Related U.S. Application Data

[63] Continuation of Ser. No. 786,624, Apr. 11, 1977, abandoned.

[51] Int. Cl.³ .............................................. A23N 15/00
[52] U.S. Cl. ........................................... 15/3.11; 209/1; 209/261; 209/285; 134/161; 171/129
[58] Field of Search ............... 209/285, 324, 325, 288, 209/289, 396, 363, 11, 2, 247, 310; 24 1/85, 205, 206; 171/116, 129, 101; 51/58; 134/104, 161, 159, 164; 15/3.11

[56] References Cited

U.S. PATENT DOCUMENTS

| | | | |
|---|---|---|---|
| 100,102 | 2/1870 | Laberteaux | 171/116 X |
| 118,895 | 9/1871 | Baker | 171/129 |
| 293,983 | 2/1884 | Roper | 209/322 |
| 366,526 | 1/1892 | Kelley | 209/324 X |
| 732,294 | 6/1903 | Groves | 241/205 X |
| 747,771 | 12/1903 | Richter | 209/285 X |
| 1,313,702 | 8/1919 | Krieger | 51/58 |
| 1,321,773 | 11/1919 | Ross | 209/285 X |
| 1,631,517 | 6/1927 | Christel | 209/384 X |
| 1,776,318 | 9/1930 | Keet | 241/206 X |
| 1,840,718 | 1/1932 | Hohnhorst | 51/58 |
| 2,485,718 | 10/1949 | Eberson | 241/206 X |
| 2,583,762 | 1/1952 | Anhanger | 241/206 X |
| 2,624,458 | 1/1953 | Molnau | 209/285 X |
| 2,626,708 | 11/1953 | Shuler | 209/289 X |
| 2,656,661 | 10/1953 | Walz | 171/101 X |
| 2,772,053 | 11/1956 | Schmidtmann | 209/325 X |
| 2,833,481 | 5/1958 | Perks | 241/85 X |
| 2,882,872 | 1/1958 | Krengel | 171/116 X |
| 3,055,500 | 9/1962 | Aubert-Maguero | 209/288 |
| 3,548,546 | 12/1970 | Thielenhaus | 51/58 X |
| 3,736,183 | 5/1973 | Schrier | 51/58 X |
| 3,958,371 | 5/1976 | Redko | 51/58 X |

FOREIGN PATENT DOCUMENTS

| | | | |
|---|---|---|---|
| 853139 | 10/1970 | Canada | 209/288 |
| 392606 | 3/1924 | Fed. Rep. of Germany | 241/85 |
| 1005778 | 4/1957 | Fed. Rep. of Germany | 171/129 |

*Primary Examiner*—Robert Halper
*Attorney, Agent, or Firm*—Cushman, Darby & Cushman

[57] ABSTRACT

Apparatus for cleaning objects, especially root crops such as sugar beet, comprises first and second members defining first and second surfaces respectively arranged for cleaning objects by relative movement between the surfaces and the objects to be cleaned. The first and second surfaces are arranged to converge towards each other over at least a part of the extent of each surface and are preferably in generally cylindrical form. Driving means drive the first member in a reciprocatory movement such that the first surface moves towards and away from the region of convergence of the surfaces, and drive the second members in a motion such as to effect at least an average movement of the second surface towards the region of convergence of the surfaces. Preferably the first and second members are rotary members positioned generally side by side with the axes of rotation thereof substantially parallel. Preferably there is provided a third rotary member defining a third surface in the general form of a cylinder, the three rotary members being positioned substantially parallel to each other, and the first member being positioned in a region generally intermediate the second and third members.

29 Claims, 13 Drawing Figures

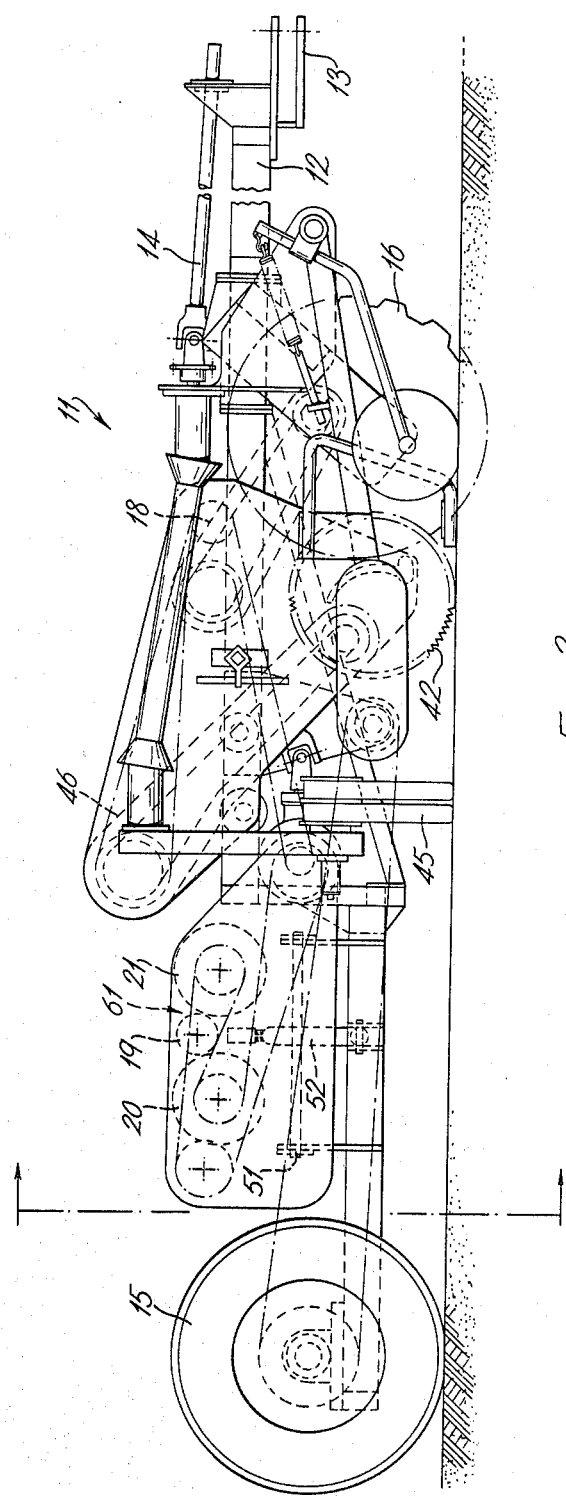

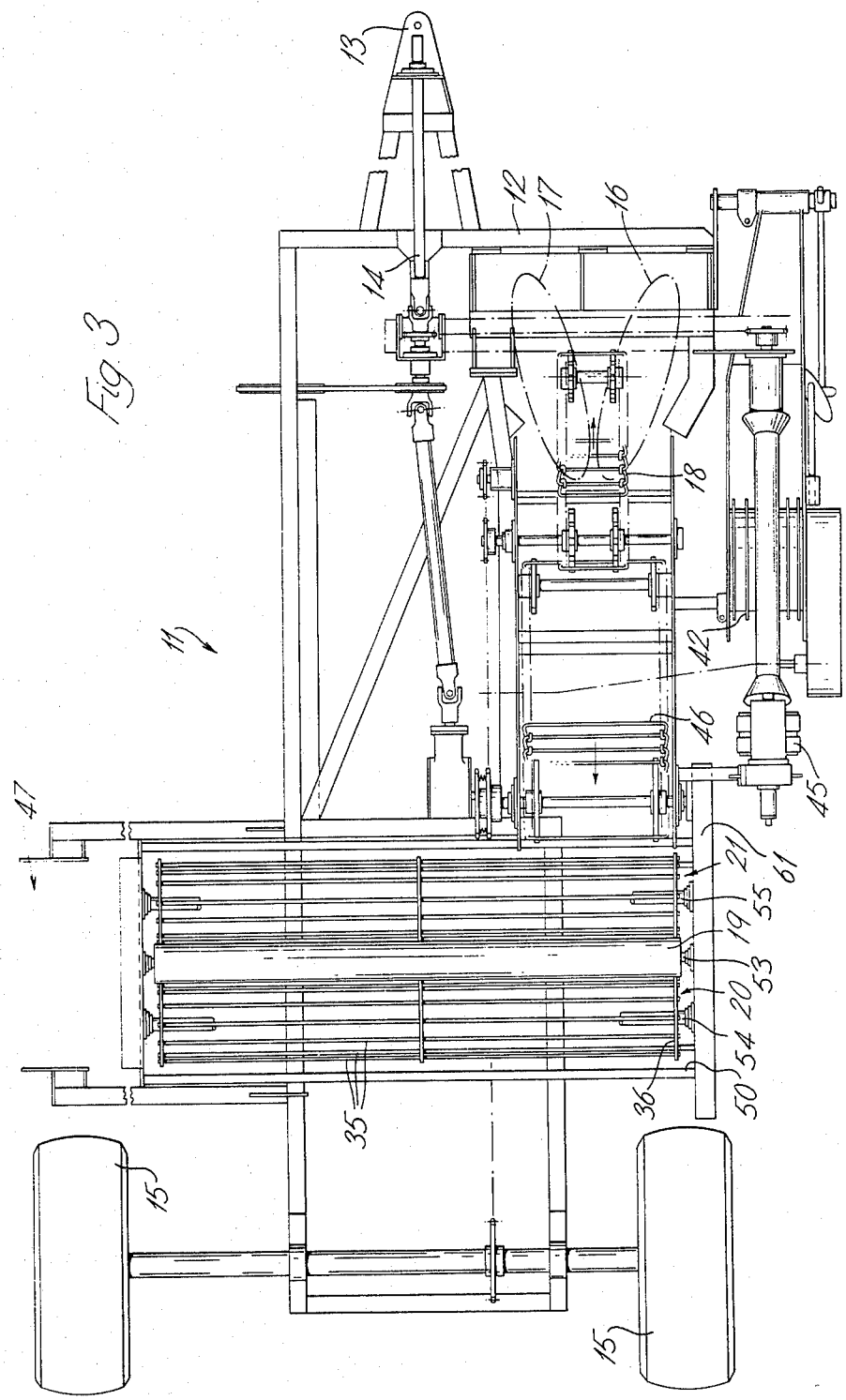

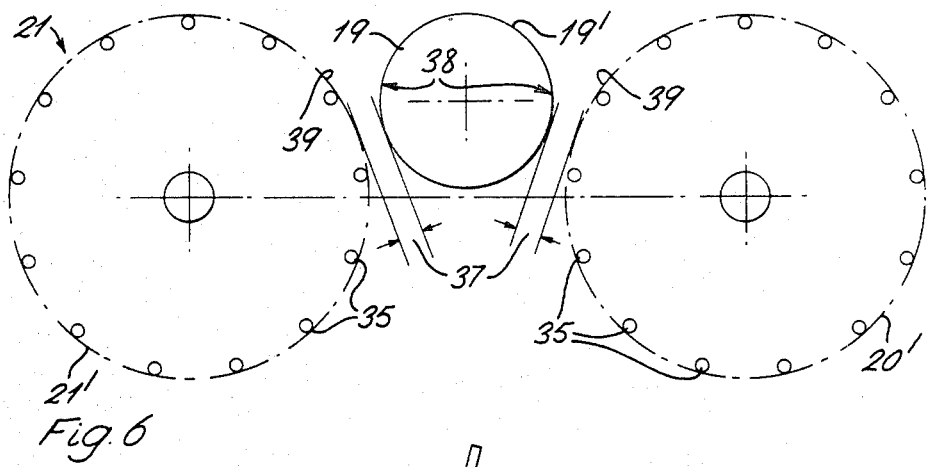
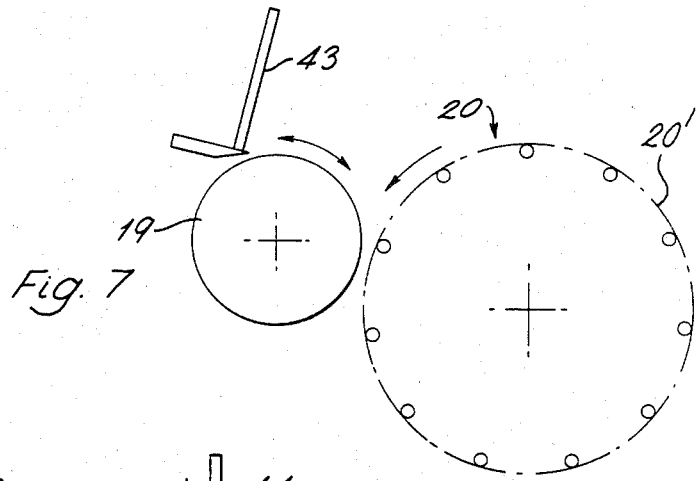
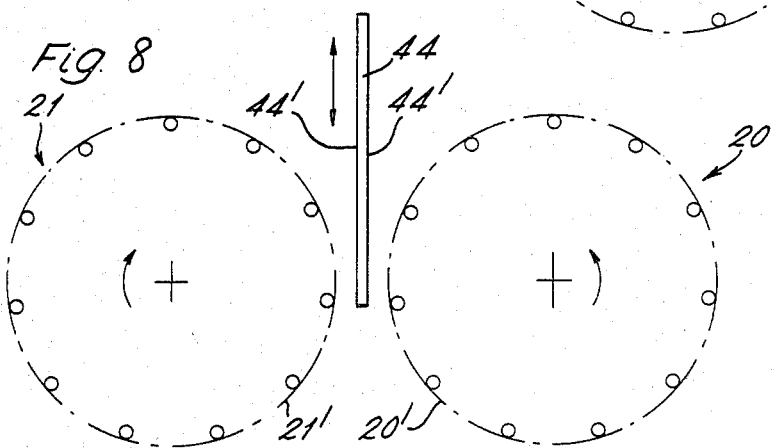

CLEANING APPARATUS

This is a continuation of application Ser. No. 786,624 filed Apr. 11, 1977, now abandoned.

The present invention relates to apparatus for cleaning objects and is concerned in particular, but not exclusively with apparatus for cleaning root vegetables such as sugar beet.

Harvesters for root vegetables, particularly sugar beet, commonly operate in such a manner that a large proportion of the material lifted comprises earth. The extent to which this earth is removed from the crop in its passage through a harvester is dependent upon the soil type and its moisture content. At present, with sugar beet, it is common practice to hold the harvested material in a clamp to await bulk transport to the processing factory. When the crop is removed from the clamp and passed to the transport container for transfer to the factory a further attempt may be made to clean the dirt from the beet. This is usually done by lifting the beet from the clamp by a tractor front end loader on to a rod link elevator chain, of the type commonly incorporated in harvesters, which elevates the beet to a transport container and at the same time allows some of the dirt to fall from the beet.

The above system is wasteful of energy and transport facilities in that unwanted dirt in the form of earth is transported to the sugar beet factories and an additional job of cleaning is introduced at the factories. The efficiency of the elevator chain as a cleaner is poor. Care has to be taken to match the pitch of the elevator chain to the size of the beet and the condition of the beet and earth mixture. Furthermore under adverse harvesting conditions it may be necessary to accept high beet losses in the form of broken roots left in the ground to avoid lifting too much dirt with the beet.

According to the present invention there is provided apparatus for cleaning objects comprising first and second members defining first and second surfaces respectively arranged for cleaning objects by relative movement between the surfaces and the objects to be cleaned, the first and second surfaces being arranged to converge towards each other over at least a part of the extent of each surface, and driving means for driving the first member in a reciprocatory movement such that the first surface moves in a reciprocatory movement towards and away from the region of convergence of the surfaces and for driving the second member in a motion such as to effect at least an average movement of the second surface towards the region of convergence of the surfaces.

In some arrangements the driving means may be adapted to drive the first member in a substantially linear reciprocatory motion, but in preferred arrangements the first member is a rotary member defining the first surface in the general form of a cylinder, and the driving means is adapted to drive the first member in a rotary receiprocatory motion. Such rotary motion of the first member may be solely a reciprocatory motion, or there may be superimposed on the reciprocatory rotary motion a slow average rotary motion in one sense only.

Also preferably the second member is a rotary member defining the second surface in the general form of a cylinder, and the driving means is adapted to drive the second member in a rotary motion.

The movement of the second member may include a component of reciprocatory motion or may include a variation of speed of movement, but it is preferred that the driving means is adapted to drive the second member in a continuous rotary motion in a single sense of rotation.

Each surface may be constituted by a physical surface of the member defining the surface, or may be a virtual surface comprising an envelope of surface portions of the member but not defined by a continuous physical surface of the member.

The surfaces may be plane or curved surfaces and may be of similar configuration or different. Preferably at least one of the surfaces is in the form of a cylinder, or in part cylindrical form, and the other surface is in the form of a plane surface or alternatively is also in the form of a cylinder, or of part cylindrical form.

Where the first and second members are rotary members, the first and second rotary members may conveniently be positioned generally side by side with the axes of rotation thereof substantially parallel, and conveniently the axis of the first rotary member may be at a higher level than the axis of the second rotary member. Preferably the first surface is in general form of a cylinder having a smaller diameter than that of the second surface.

In preferred arrangements where the second member is a rotary member, there may be provided a third member comprising a rotary member defining a third surface in the general form of a cylinder, the second and third members being spaced apart and the first member being so positioned as to form on one side thereof a region of convergence between the first and second surfaces and on the other side thereof a region of convergence between the first and third surfaces, the driving means being adapted to drive the first member in a reciprocatory movement such that the first surface moves in a reciprocatory movement towards and away from the region of convergence of the first and third surfaces and the driving means being adapted to drive the third member in a motion such as to effect at least an average movement of the third surface towards the region of convergence of the first and third surfaces.

In such an arrangement the driving means is preferably adapted to drive the third member in a continuous rotary movement in a single sense of rotation.

In such arrangements, where all three members are rotary members, the three rotary members may be positioned with their axes substantially parallel to each other, the second and third members being spaced apart and the first member being positioned in a region generally intermediate the second and third members. Preferably the axis of rotation of the first member is positioned at a higher level than the axes of rotation of the second and third members.

Preferably at least one of the members includes spaces for passage of dirt through the surface of the member. In some preferred arrangements, the second surface and, where provided, the third surface may each comprise a virtual surface defined by a grid of spaced apart bars for passage of dirt through the member. The bars may comprise longitudinal bars running along the length of the rotary member generally parallel to its axis of rotation, and may be yieldably mounted in such a manner as to be deflectable from a normal operating position upon impact with objects liable to damage the bars. For example the bars may be mounted in mounting elements distributed along the axis of the member, the bars being mounted in slots in the mounting elements which allow movement of the bars towards and away from the axis of rotation of the member, the arrangement being such that in operation upon rotation of the rotary member centrifugal force urges the bars outwardly along the slots to assume a normal operating position in which the bars define the said virtual cylindrical surface. Alternatively or in addition the bars may be biassed towards a normal operating position by a resilient biassing means.

Conveniently the first member has a continuous substantially uniform surface forming the said first surface, for example a smooth steel cylinder. Where the first member is a rotary member, the driving means may be adapted to drive the first rotary member in a rotary reciprocatory motion having an amplitude in the range 20° to 120°, preferably in the range 20° to 90°.

Where a third member is provided the diameters of the second and third surfaces may conveniently be the same, and the diameter of the first surface may be in the range one fifth to three fifths fraction of the diameter of the second and third surfaces. Also conveniently the upper portions of the three generally cylindrical surfaces may lie in a single plane.

Conveniently the frequency of reciprocation of the first surface is close to the frequency of rotation of the second rotary member but differs therefrom by a small amount. Preferably the difference between the frequencies of the movements of the first and second surfaces is an amount up to 10% (for example 5%) of the frequency of the movement of the second surface. Where a third member is provided it is preferred that the third member is driven at the same frequency as the second member. Preferably the frequencies of the second and third members are in the range 200 to 400 revs. per minute.

In some arrangements there may be provided means for urging the objects to be cleaned over the said surfaces and there may be provided means for urging the objects to be cleaned along the surfaces in a direction transverse to the direction of movement of the said surfaces.

Embodiments of the invention find particular use where the surfaces of the members, the dimensions of the members, and the speed of movement of the members are all arranged to be suitable for cleaning dirt from root crops.

Embodiments of the invention will now be described by way of example with reference to the accompanying drawings in which:

FIG. 2 is a side elevation of the harvester shown in FIG. 1;

FIG. 3 is a plan view of the harvester shown in FIG. 1;

FIG. 6 is a diagrammatic end view showing the general layout of the cleaning apparatus shown in particular in FIG. 4;

FIGS. 7 and 8 are diagrammatic end views of alternative cleaning mechanisms embodying the invention;

Figure 1:
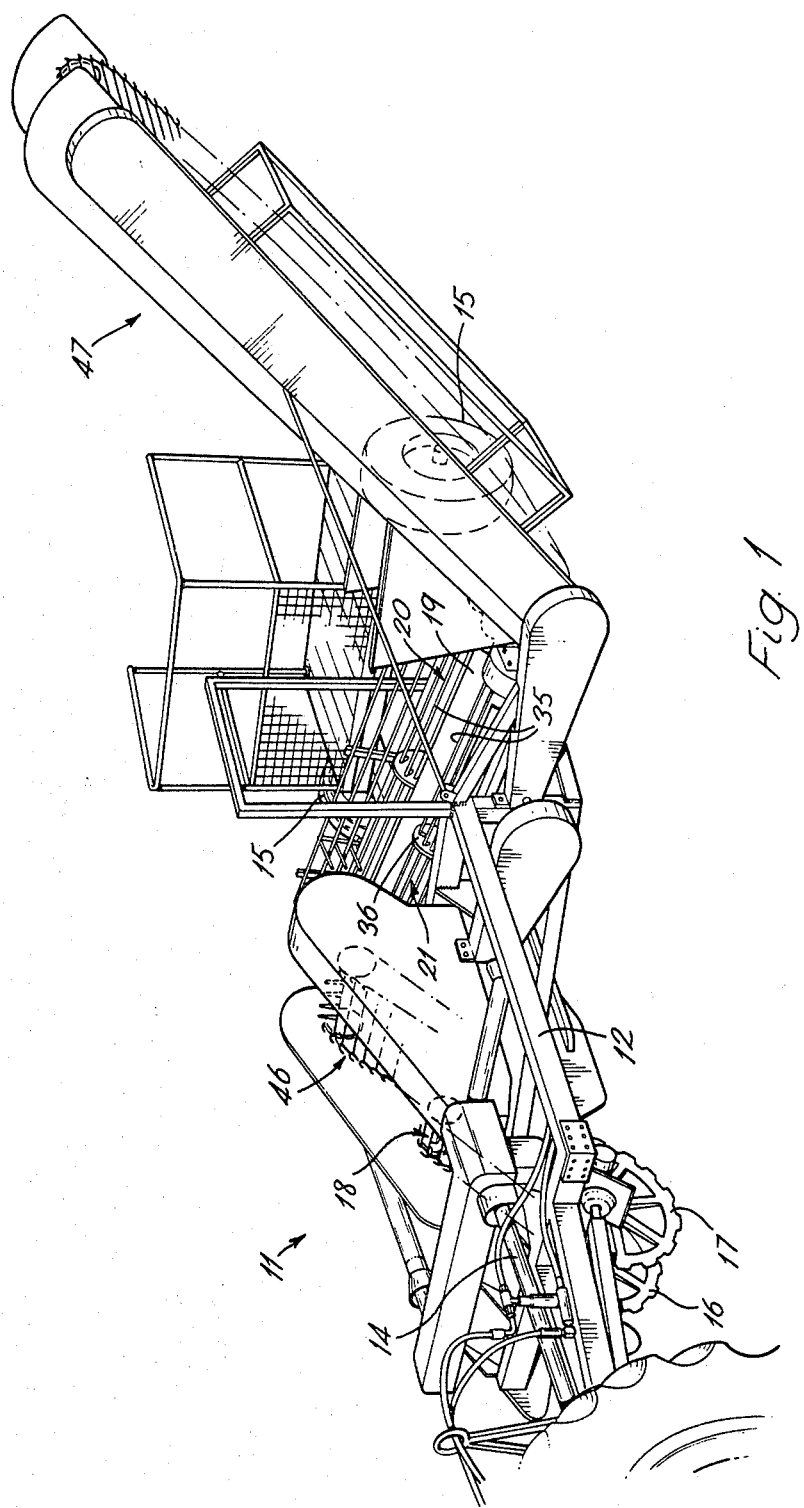
FIG. 1 is a perspective view, partly cut away, of the general layout of a sugar beet harvester embodying the present invention.

Referring firstly to FIGS. 1 to 6 there is shown a sugar beet harvester 11 for mounting behind a tractor and adapted to be powered by the tractor. The harvester 11 has a main frame 12 with a coupling 13 adapted to be connected to the rear of the tractor. Driving power for the harvester is supplied from the power-take-off of a tractor to a shaft 14. The harvester is arranged to be trailed behind the tractor on a pair of land wheels 15 (FIGS. 2 and 3).

The apparatus for lifting the beet from the ground is conventional, and includes a pre-topping unit which is obscured in FIG. 1 as it is situated on the far side of the harvester. The pre-topping unit has a conventional topper 42 and flail 45. After pre-topping, the sugar beet are lifted by conventional lifting wheels 16 and 17 and the beet are transferred by the lifting wheels 16 and 17 and by the underside of a conventional overhead chain link conveyor 18 on to an elevator 46 and thence to a cleaning mechanism which embodies the present invention.

This cleaning apparatus comprises a first rotary member in the form of a cylinder 19, and second and third rotary members constituted by cylindrical cages 20 and 21. The roller 19 and cylindrical cages 20 and 21 are arranged with their axes parallel and positioned transversely across the width of the machine. The cylindrical cages 20 and 21 are driven to rotate inwardly towards the centre roller 19 and to effect a cleaning action which will be described in more detail hereinafter.

The beet lifted by the wheels 16 and 17 are transferred to the upper part of the cage 21 which carries the beet rearwardly to the centre roller 19. The roller 19 and cages 20 and 21 are inclined downwardly from left to right in FIG. 1, so that the sugar beet roll and bounce along the length of the roller 19 and cages 20 and 21 to a further elevator 47 which lifts them into a conventional trailer (not shown). The roller 19 and cages 20 and 21 are driven from the drive shaft 14 which also drives the pre-topping apparatus 42 and 45 and the overhead chain link conveyor 18.

Figure 4:
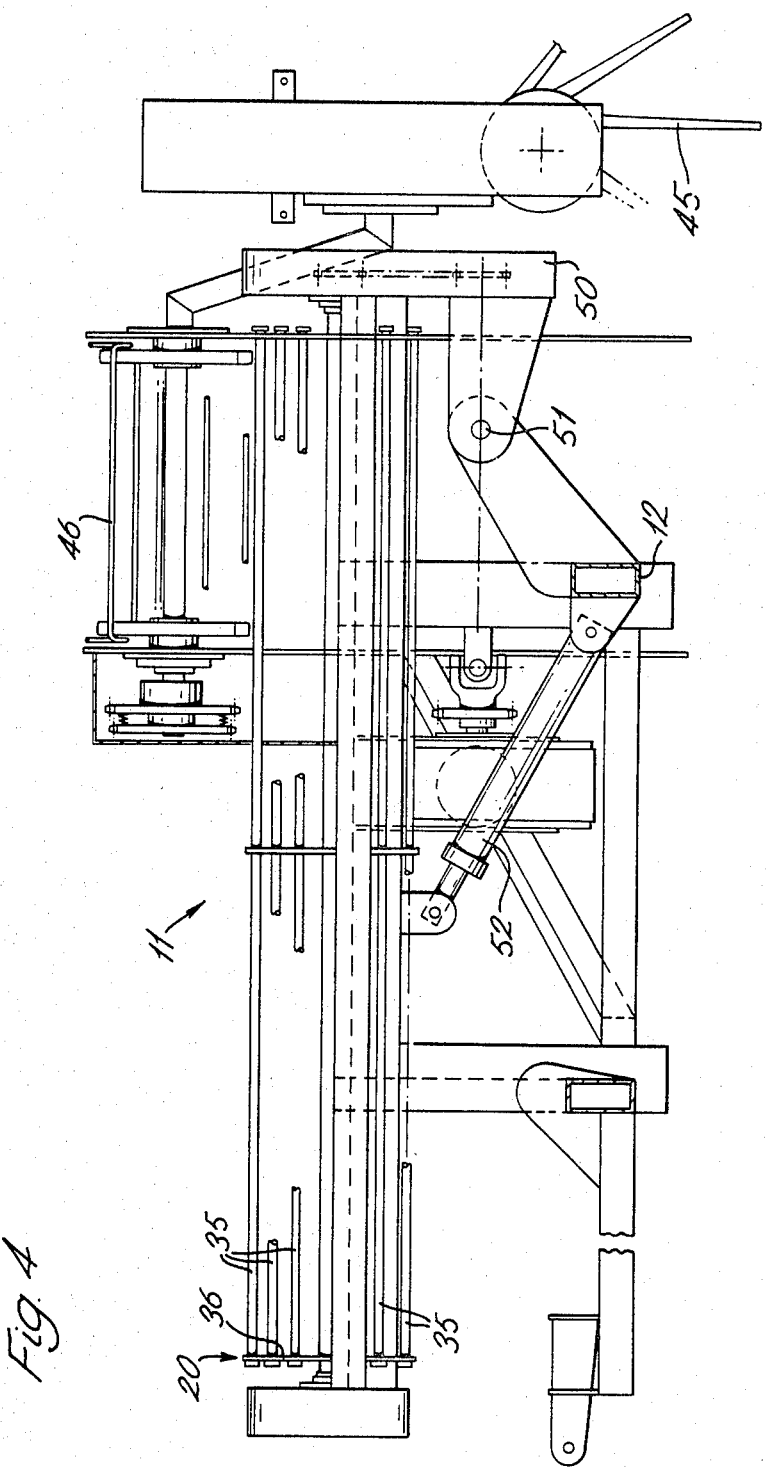
FIG. 4 is a rear view of a cleaning apparatus embodying the invention and incorporated in the sugar beet harvester shown in FIG. 1.

Referring particularly to FIG. 4, the cages 20 and 21 and roller 19 are mounted in a sub-frame 50 which is pivotable about a pivot 51 on to the main frame 11 under the control of a hydraulic ram 52. The purpose of this pivotable sub-frame 50 is to allow adjustment of the angle of the cages 20 and 21 and roller 19 relative to the level of the ground wheels of the harvester. In normal operation the cleaning apparatus 19, 20 and 21 will be inclined to the horizontal downwardly from right to left in FIG. 4 at an angle in the region of 5°. In FIG. 4 the apparatus is shown in its horizontal rest position suitable for travelling before use. In operation, the inclination of the cleaning apparatus may be varied for example in a range 0 to 15 degrees to the horizontal.

In a convenient arrangement, not shown, there may be inclined means for automatically varying the inclination of the cages relative to the ground wheels in such a manner as to compensate for variations in ground contour and to maintain a preset angle relative to the horizontal.

Figure 5:
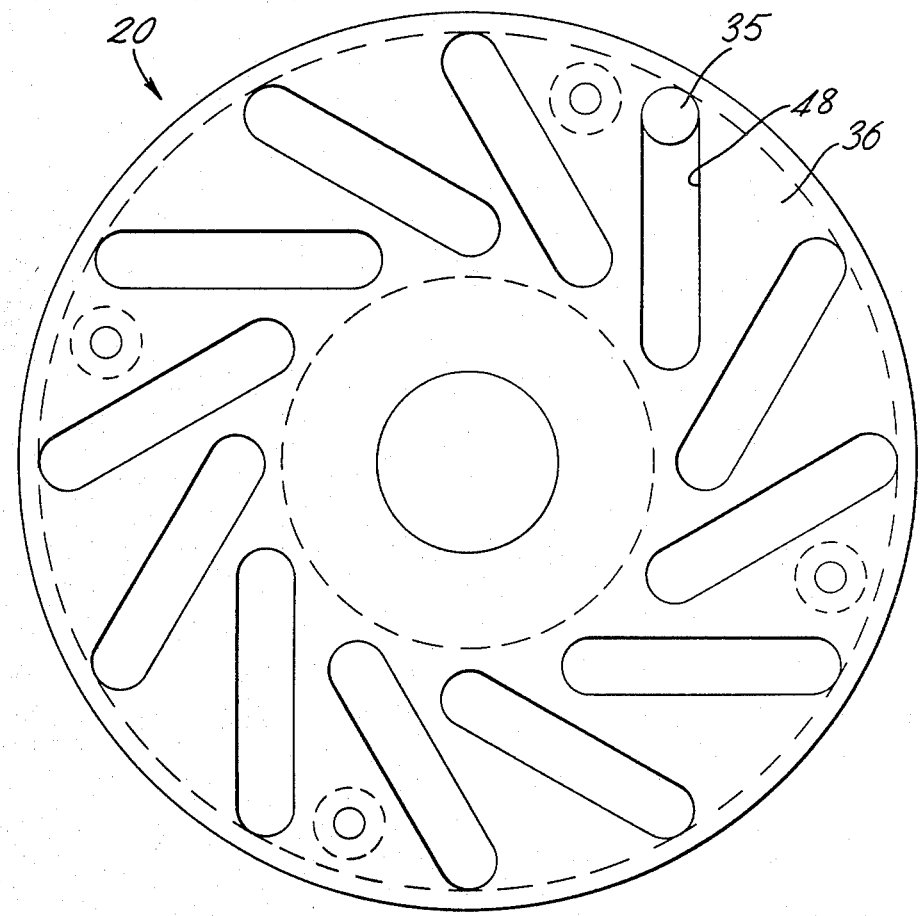
FIG. 5 is an end view of a cylinder used in the cleaning apparatus of FIG. 4.

Referring particularly to FIGS. 3, 4 and 5, the roller 19 comprises a cylindrical steel roller having a continuous surface. By way of example the roller 19 may be 4⅝" in diameter and 60" long and may be positioned between the cylindrical cages 20 and 21 with the uppermost part of the roller 19 in line with the uppermost parts of the cylindrical cages 20 and 21.

Each of the cages 20 and 21 consists of a hollow cylinder composed of twelve equally spaced bars 35, for example ⅜" diameter spring steel rod, supported along the length of each cylindrical cage by three equally spaced discs 36.

As is shown particularly in FIGS. 3 and 5, the bars 35 forming the outer cylindrical surface of the cages are mounted in slots 48 cut in the supporting discs 36. The purpose of mounting the bars 35 in the slots 48 is to allow a degree of yieldability of the bars to avoid damage to the bars if stones or like objects enter the cleaning apparatus with the sugar beet. In operation the cages 20 and 21 are rotated at a speed such that the bars 35 are thrown outwardly along the slots by centrifugal force and adopt their normal working position at the outer ends of the slots. Each of the slots 48 is inclined to a radius of the supporting disc 36 in a sense such that if a stone jam in the cleaning apparatus the bars 35 can slide inwardly towards the axis of the cage and at the same time rearwardly along the slot relative to the direction of rotation of the cage. Thus it will be appreciated that since the cages 20 and 21 are rotated in contra-rotation, the slots 48 for the two cages 20 and 21 will be inclined in opposite directions. The slots shown in FIG. 5 are appropriate for rotation of the disc 36 in FIG. 5 anti-clockwise.

By way of example of dimensions of the elements shown in FIG. 5, each of the slots 48 may be 2½" long between the centres of semi-circles defining the ends of the slots. The width of each slot may for example be ⅜" and the total length of the slot from end to end may be 3". The angle of each slot to a radius of the disc 36 passing through the centre end of the slot may for example be 30°. The angle of each slot to a radius may fall within a range of say 20° to 45°.

The roller 19 defines a first surface 19' comprising the physical outer surface of the roller. The cylindrical cages 20 and 21 define second and third surfaces 20' and 21' respectively which are cylindrical virtual surfaces comprising the envelopes of the outermost surface portions of the bars 35. In subsequent discussion of the cages 20 and 21, where the diameter of a cage is referred to, this is to be taken to indicate the diameter of the virtual surface being the cylindrical envelope of the outermost surfaces of the bars 35 when they are at the outer ends of the slots 48 in their operating positions.

The diameters of the two cylindrical cages 20 and 21 are equal and are larger than the diameter of the roller 19. By way of example, the diameter of each cylindrical cage 20 and 21 may be 10". The roller 19 and the cages 20 and 21 may be positioned so that the minimum spacing between tangents to the roller 19 and the cage 20 (or the cage 21) is ½", as is indicated (not to scale) at 37 in FIG. 6.

In operation the cylindrical cage 20 is rotated anticlockwise and the cylindrical cage 21 is rotated clockwise so that the upper parts of the two cages rotate inwardly towards the filler 19. By way of example the cages 20 and 21 may each be rotated at a frequency of 300 revolutions per minute. The roller 19 is arranged to be subject to a reciprocatory rotary motion at the same frequency as the cages 20 and 21. The roller 19 may be arranged to oscillate through a total angle of rotation selected from the range 20° to 90°, depending on crop conditions, at 300 cycles per minute. The factors which determine the amplitude of oscillation selected are the amount of dirt to be removed and the likely damage to crop. A greater amplitude should be selected for a dirtier crop with greater proportions of earth lifted. The amplitude should be just sufficient to remove the dirt but not large enough to cause damage to the beet.

Considering the roller 19 and the cage 20, these two members define cylindrical surfaces 19' and 20' of which portions 38 and 39 respectively converge towards each other at the upper part of the region between the roller 19 and the cage 20. Similar surface portions 38 and 39 are present on the other side of the roller 19 and on the cage 21 respectively.

The effect of the contra-rotating cages 20 and 21 is to urge the sugar beet inwardly towards the roller 19. The effect of the oscillating roller 19 is to urge the sugar beet, on each side of the roller 19, alternately towards and away from the area of convergence of the roller 19 with the cages 20 and 21. This motion produces a tumbling action of the sugar beet against the cages 20 and 21 which is effective to clean dirt from the sugar beet. The dirt is driven through the gap between the roller 19 and the cages 20 and 21, and through the spaces between the bars on the cages 20 and 21. The gaps between the roller 19 and the cages 20 and 21, the speeds of rotation of the elements, and amplitude of oscillation of the roller 19 are selected so as to ensure that the beet is not damaged by being trapped between the roller 19 and one of the cages 20 or 21, but is drawn sufficiently into the convergence region between the surfaces 38 and 39 to scrape off the dirt. It is one advantage of the embodiments of the present invention described, that the severity of the cleaning action can easily be adjusted by varying the amplitude of oscillation of the roller, and the angle of inclination of the cleaning cage subframe.

Figure 3A:
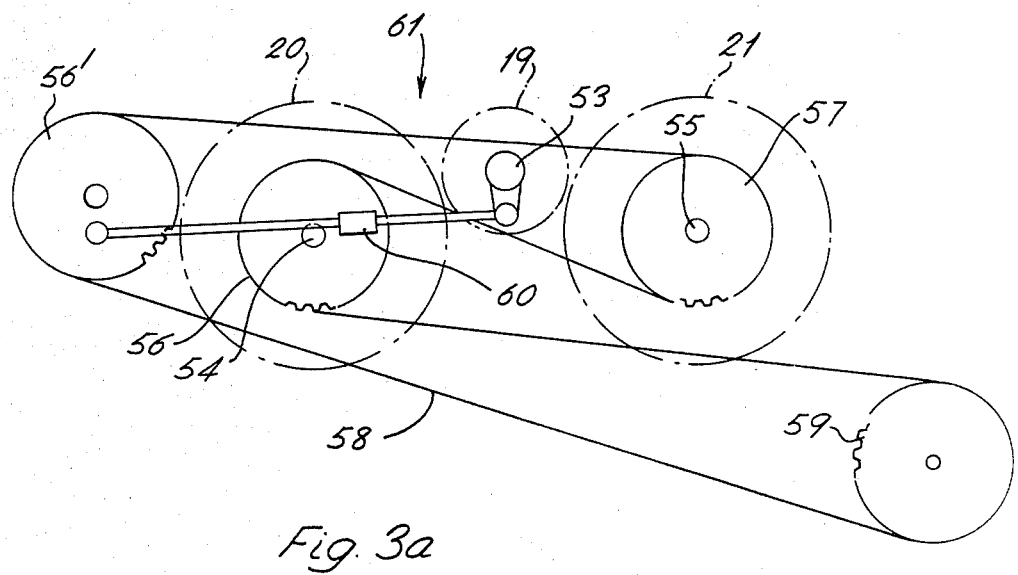
FIG. 3A is a diagrammatic side view of a drive means shown in FIG. 3.

In FIG. 3A there is shown diagrammatically a drive means 61 for effecting continuous rotation of the cages 20 and 21 and reciprocatory motion of the roller 19. The roller 19 is mounted on an axle 53 and the cages 20 and 21 are mounted on axles 54 and 55 respectively. The axles 54 and 55 carry sprockets 56 and 57 respectively driven by a roller chain 58 which in turn is driven by a sprocket 59 coupled by conventional means to the p.t.o. of the tractor. The roller axle 53 carries a crank mechanism 60 driven by an idler sprocket 56'. Preferably the sprocket 56' has a diameter different to (and preferably smaller than) the diameters of the sprockets 56 and 57 (which preferably are equal), for example the sprocket 56' having one tooth less than the sprockets 56 and 57. Thus it is preferred to drive the roller 19 at a frequency slightly higher than the frequencies of the cages 20 and 21.

The purpose of driving the roller 19 at the different frequency is to reduce wear on the cages 20 and 21. It is found that if the cages 20 and 21 and the roller 19 are all driven at the same frequency, the maximum wear on the cages, which is produced at the times of reversal of the reciprocating roller 19, will always occur at the same few bars of the cages. If the roller 19 is driven at a slightly different frequency, the cages 20 and 21 will process gradually relative to the roller 19 so that uneven wear will be avoided.

In some uses there may occur a build-up of earth adhering to the roller 19. If necessary there may be provided means for cleaning the roller during normal operation. One arrangement (not shown), is to provide a scraper blade positioned along the length of the roller 19 and urged against the underside of the roller. To effect the cleaning, the drive mechanism to the roller 19 is modified to superimpose on the reciprocatory motion of the roller a slow average rotary motion in one sense only, for example at an average speed of rotation in the region of 10 to 50 r.p.m., conveniently 20 r.p.m. Dirt scraped from the roller conveniently falls back to ground beneath the machine.

By way of example of the dimensions which may be used in operating the machine, the diameter of the roller 19 is preferably in the range 1/5 to 3/5 fraction of the diameter of the cages 20 and 21. The diameter of the cages 20 and 21 is preferably within the range 8 to 15 inches and the length of the cages is preferably in the range 30 inches to 100 inches. The maximum total angle of deflection of the roller 19 during its oscillatory motion is preferably in the range 20° to 120° preferably not more than 90°. The frequency of oscillation of the roller 19 is preferably in the range 200 cycles per minute to 400 cycles per minute. The frequency of rotation of the cylindrical cages 20 and 21 is preferably equal to the frequency of oscillation of the roller 19, but may differ from this frequency. Thus the speed of rotation of the cages 20 and 21 is preferably in the range 200 r.p.m. to 400 r.p.m.

Turning now to FIGS. 7 and 8 there are shown in diagrammatic form two alternative forms of a cleaning mechanism embodying the invention. In these figures elements performing the same function as the elements shown in the previous figures are indicated by like reference numerals.

In FIG. 7 there is shown a single sided version of the cleaning apparatus shown in FIG. 6, in that the third member, the cylindrical cage 21, is omitted and in its place a fixed baffle 43 is positioned against an upper portion of the roller 19. As in the apparatus shown in FIG. 7, the cage 20 is rotated anti-clockwise and the roller 19 has an oscillatory rotary motion of the same frequency as the cage 20.

In FIG. 8 there is shown a modification in which cylindrical cages 20 and 21 are rotated continuously and a plate 44 is provided between and tangential to the surfaces of the cylindrical cages 20 and 21. The plate 44 is subject to a linear reciprocatory movement which has a comparable effect to the rotary oscillatory movement of the roller 19 in FIG. 6. The effect of the continuous rotation of the cylindrical cages 20 and 21 in FIG. 8 is to carry the objects to be cleaned towards the oscillating plate 44 while the reciprocatory movement of the plate 44 has the effect of alternately urging the objects to be cleaned towards and away from the region of convergence of the surfaces of the plate 44 and the rollers 20 and 21. Conveniently the plate 44 may be positioned vertically as shown in FIG. 8. The plate 44 need not be a flat plate and may for example be wedge shaped. The surface of the element 44 may be a plain continuous surface, or a corrugated surface, or may be an interrupted surface such as weld mesh.

It will be appreciated that the operation of the invention is not limited to the particular layout of the sugar beet harvester illustrated in FIG. 1 nor is it limited to a single row harvester. The various drives to the components of the harvester are not shown completely and may be of conventional arrangement. Several of the conventional parts of the harvester shown in FIG. 1 may be replaced by alternatives. For example the lifting wheels 16 and 17 and the overhead chain link conveyor 18 show only one means of getting the beet from the ground to the cleaning cages 20 and 21. For example as an alternative the overhead chain link conveyor 18 may be replaced by a set of rotating flails. In addition, or as a separate alternative, lifting shares may be used instead of the lifting wheels 16 and 17.

In addition to variations of the conventional components of the harvester shown in FIG. 1, a number of variations may be made of the components directly concerned with the present invention. For example there may be added to the cleaning section a standard chain link conveyor positioned over the cages 20 and 21, and spaced therefrom by about 6 inches. Such a conveyor can be arranged to urge the beet along the cleaning cages by action on the beet when they bounce up from the cages. Also the conveyor may have the purpose of pressing down lightly on the sugar beet to ensure proper contact between the sugar beet and the cleaning rollers 20 and 21. This assists in preventing any beet riding freely along the tops of the rollers without approaching the region of convergence between the cages 20 and 21 and the central roller 19.

Another means for urging the crop along the cleaning cages comprises a bank of figures mounted on a crank mechanism and arranged to follow a cyclical motion in which the fingers enter the region generally above the cages and roller, progress along the length of the cages a short way, withdraw from the region, and return to their original position before re-entering the region above the cages. This motion can be arranged to push the beet along the cages, and can conveniently be used at the start of the cleaning cages.

Further variations to reduce the possibility of stone damage, when working soils where this might occur, include introducing flexibility into the bars of the cleaning cages 20 and 21. For example it is possible to anchor the bars 35 rigidly at one end only and loosely to hold them in position in the centre of the cage and at the end nearest to the wheels 16 and 17.

Although in FIG. 6 the central roller 19 has been shown with its uppermost portion in the same horizontal plane as the uppermost portions of the cages 20 and 21, it will be appreciated that for different working conditions it may be appropriate to raise or lower the roller 19 relative to the cages 20 and 21.

Figure 9:
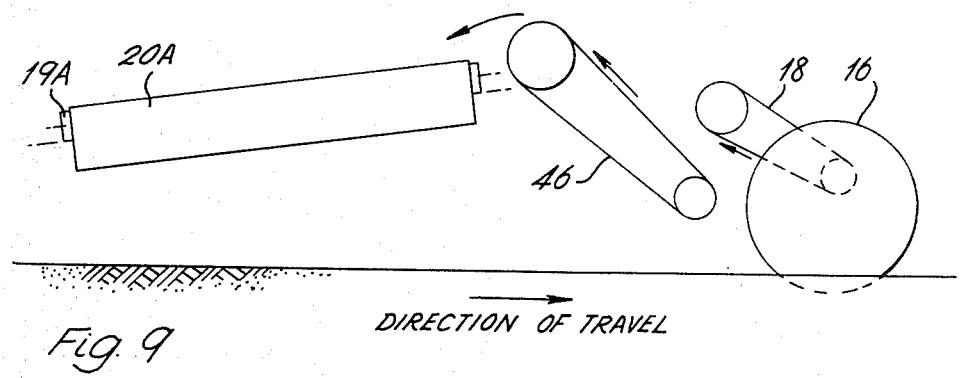
FIGS. 9 and 10 are diagrammatic side and plan views of a multi-row sugar beet harvester embodying the invention.
Figure 10:
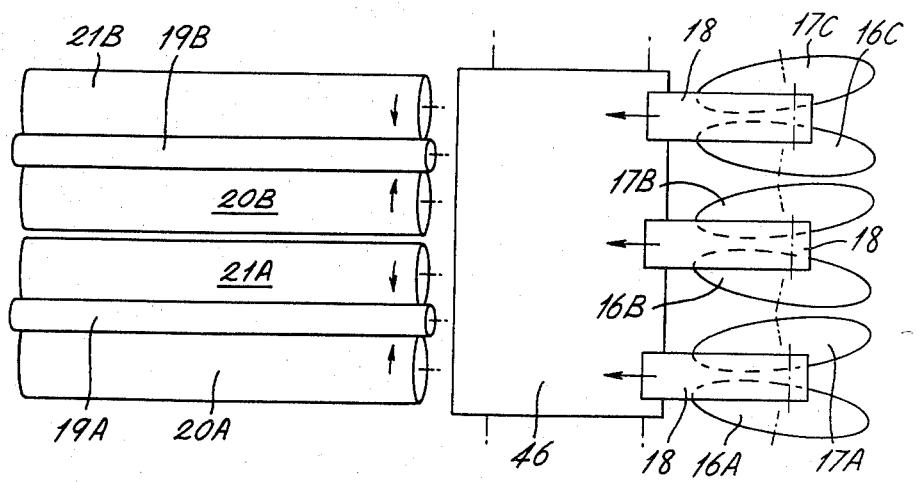

Embodiments of the invention may be provided in which a multirow sugar beet harvester feeds sugar beet to be cleaned on to a plurality of sets of cleaning rollers and cages similar to those shown in FIG. 6. In FIGS. 9 and 10 there is shown an example of an arrangement of a multirow harvester embodying the invention. As shown in FIG. 10, three pairs of lifting wheels 16A, 17A, 16B, 17B, 16C and 17C lift sugar beet from three rows and feed the sugar beet on to an elevator 23. Behind the elevator 23 are two pairs of parallel cleaning cages 20A, 21A, 20B and 21B corresponding to those described with reference to the previous figures, together with corresponding rollers 19A and 19B. As shown in FIG. 10, each pair of cages 20 and 21 contrarotate inwardly towards each other and towards their associated roller 19.

For the three sets of lifting wheels shown, the first set of lifting wheels 16A and 17A feeds sugar beet via the elevator 23 on to the first pair of cages 20A and 21A.

The middle pair of lifting wheels 16B and 17B feed sugar beet via the elevator 23 to the cages 21A and 20B. Since these cages contra-rotate upwardly and away from each other, the sugar beet delivered by the middle portion of the conveyor 23 will be driven outwardly and equally distributed between the two sets of cleaning cages 20A, 21A and 20B, 21B. Beet from the wheels 16C and 17C will be fed to the cages 20B and 21B. In this arrangement the cleaning cages and rollers are arranged to incline downwardly towards the rear of the machine, the sugar beet tumbling along the cages and rollers and being cleaned in its passage. At the rear of the machine the sugar beet is collected by a further elevator (not shown) and fed to a waiting trailer.

In alternative multi-row machines the cleaning cages and rollers may be arranged transversely across the machine.

Figure 11:
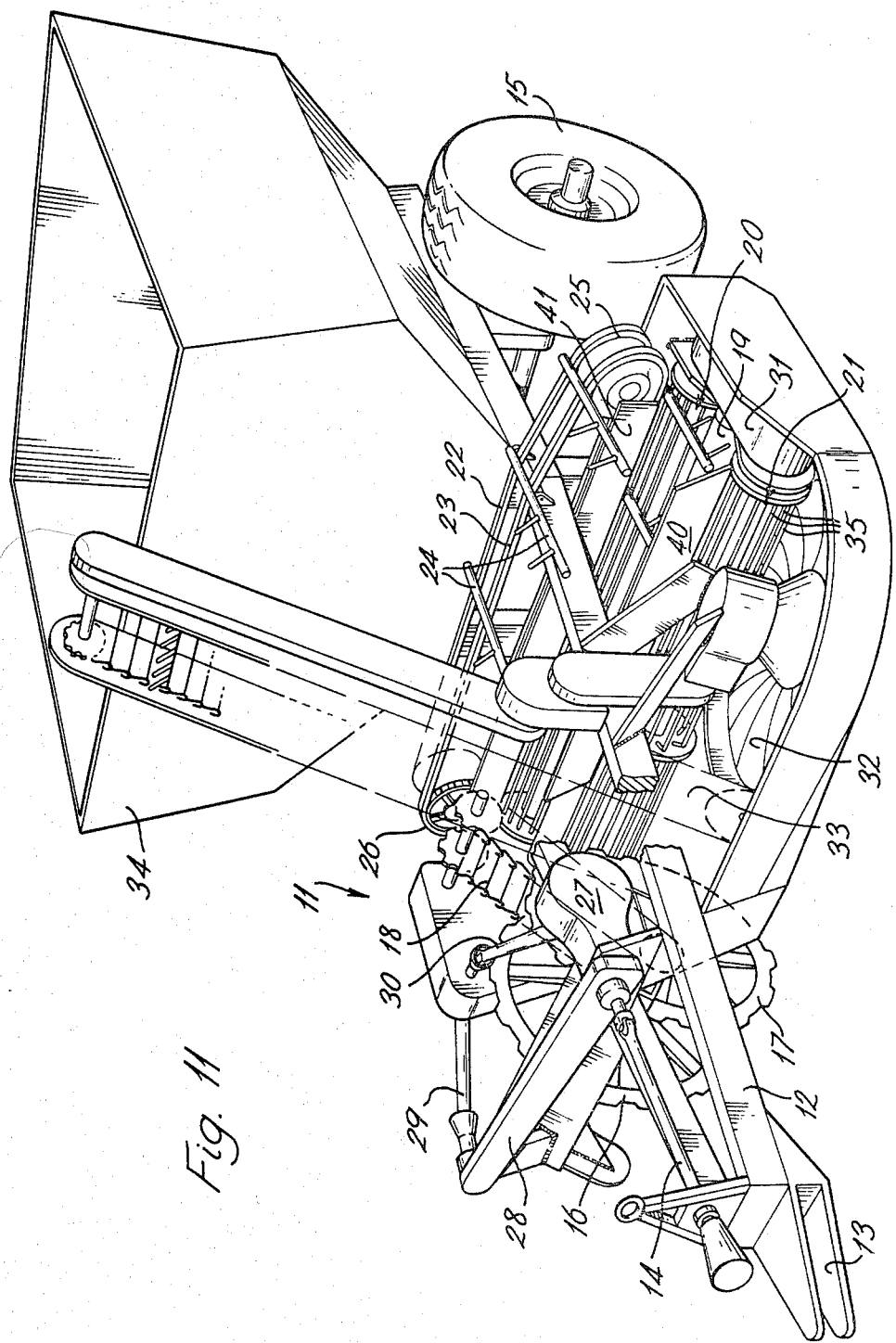
FIG. 11 is a perspective view, partly cut away, of an alternative general layout of a sugar beet harvester embodying the invention.
Figure 12:
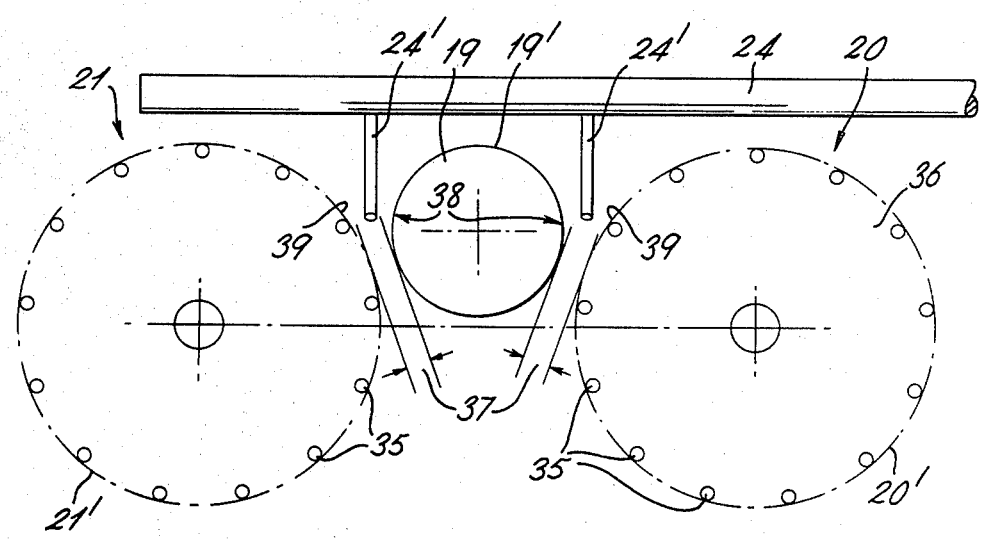
FIG. 12 is a diagrammatic end view showing the general layout of a cleaning apparatus embodying the invention and incorporated in the harvester of FIG. 11.

In FIGS. 11 and 12 there is shown in diagrammatic form a general layout of one arrangement of a self-contained sugar beet harvester embodying the invention. It will be appreciated that the apparatus is shown only diagrammatically for the purpose of showing one convenient layout. The various drives to the component of the harvester are not shown completely and may be of conventional arrangement. In the arrangement of FIGS. 11 and 12, elements corresponding to those described in previous Figures will be indicated by like reference numerals.

The embodiment described in FIGS. 11 and 12 differs from that shown in FIG. 1 in that the cages 20 and 21 have a lesser inclination to the horizontal, and the beet is moved along the cleaning cages by an overhead sweeping device, and not by gravity alone. Because of the lesser inclination of the cages 20 and 21, the elevator 23 shown in FIG. 1 can be omitted from the embodiment of FIG. 11, the beet passing directly from the lifting wheels 16 and 17 to the cages 20 and 21.

The cages 20 and 21 shown in FIGS. 11 and 12 may be identical with those described with reference to FIGS. 1 to 6, but for simplicity the slots in which the bars 35 are mounted have been omitted from FIG. 11. It will be appreciated that in some arrangements the bars need not be mounted in slots, but can be rigidly mounted or resiliently mounted in other ways.

Referring to FIG. 11, the apparatus for lifting the beet from the ground is conventional, and includes a pre-topping unit which is obscured in FIG. 11 as it is situated on the far side of the harvester. After pre-topping, the sugar beet are lifted by conventional lifting wheels 16 and 17 and the beet are transferred by the lifting wheels 16 and 17 and by the underside of a conventional overhead chain link conveyor 18 on to the cleaning mechanism which embodies the present invention.

The beet lifted by the wheels 16 and 17 are transferred to the upper part of the roller 21 which carries the beet rearwardly to the centre roller 19. The beet are swept along the cleaning apparatus 19, 20 and 21 by an overhead conveyor means comprising a pair of endless belts 22 and 23 which carry a plurality of sweeping members 24 consisting of lengths of metal round section bars. The belts 22 and 23 are mounted transversely across the harvester 11 and generally parallel to the axes of the rollers 19, 20 and 21. The belts 20 and 23 are trained about pulleys 25 and 26, the belts being driven by the pulley 26 from the drive shaft 14 via a gear box 27 and drive shafts 28 and 29. The gear box 27 also drives a drive shaft 30 which operates the pre-topping apparatus and the overhead chain link conveyor 18. The belts 22 and 23 are driven in a direction such that the lower run of the belts carries the bars 24 along the length of the cylindrical cages 20 and 21 in a direction from left to right in FIG. 1.

As shown in FIGS. 11 and 12, each of the bars 24 carries a pair of fingers 24' inclined downwardly and forwardly at an angle of 45° to the belts 22 and 23. The fingers 24' are positioned immediately above the converging regions 38 and 39 between the roller 19 and the cages 20 and 21. The purpose of the fingers 24' is to prevent the bars 24 pushing the sugar beet down into the converging regions of the roller 19 and the cages 20 and 21. In effect each of the fingers 24' works ahead of the bar 24 and momentarily lifts the beet out of the gap with the result that the bars can urge the beet along the length of the cages 20 and 21 without pressing the beet too harshly down into the cleaning gaps and causing damage to the beet.

While the beet are being cleaned on the roller 19 and cages 20 and 21, the beet are confined to the cleaning area by baffles 40 and 41. The bars 24 sweep the sugar beet along the cylinders 20 and 21 of the cleaning apparatus and deposit the beet on a longitudinal conveyor belt 31 which carries the beet forwardly relative to the motion of the harvester and deposits the beet on a rotating transfer wheel 32. The inclined wheel 32 carries the beet approximately through a 90° turn and deposits the beet at the foot of an elevator conveyor 33 which carries the beet upwardly and rearwardly and deposits the beet in a storage hopper 34.

It will be appreciated that the cleaning apparatus of the present invention has wide application including other root crops such as turnips, carrots and parsnips, and is not limited to sugar beet.

I claim:

1. Apparatus for cleaning objects comprising:
   a first rotary member;
   a second rotary member;
   a third rotary member;
   said first, second and third rotary members defining first, second and third generally cylindrical surfaces respectively for cleaning objects by relative movement between the surfaces and the objects to be cleaned;
   a frame for mounting said first, second and third rotary members with their axes substantially parallel to each other, the second and third rotary members being spaced apart and the first rotary member being positioned in a region generally intermediate the second and third rotary members so as to define an aperture for the discharge of dirt between said first and second members and between said first and third members, the axis of rotation of the first rotary member being positioned at a higher level than the axes of rotation of the second and third rotary members, the first rotary member forming on one side thereof a region of convergence between the first and second cylindrical surfaces and on the other side thereof a region of convergence between the first and third cylindrical surfaces; and
   driving means for driving the first member in a reciprocatory rotary movement and for driving the second and third rotary members in rotary motions such as to effect at least an average movement of the second cylindrical surface towards the region of convergence of the first and second cylindrical surfaces and to effect at least an average movement of the third cylindrical surface towards the region of convergence of the first and third cylindrical surfaces.

2. Apparatus according to claim 1 in which the driving means includes means for driving the second rotary member in a continuous rotary movement in a single sense of rotation and means for driving the third rotary member in a continuous rotary movement in a single sense of rotation, the sense of rotation of the third rotary member being opposite to the sense of rotation of the second rotary member.

3. Apparatus according to claim 1 in which at least the second and third members include spaces for passage of dirt through the surface of the members.

4. Apparatus according to claim 3 in which the second surface and the third surface are each a virtual surface defined by a grid of spaced apart bars for passage of dirt through the member.

5. Apparatus according to claim 4 in which the bars comprise longitudinal bars running along the length of the second and third rotary members generally parallel to the axes of rotation thereof.

6. Apparatus according to claim 5 in which the bars are yieldably mounted in such a manner as to be deflectable from a normal operating position upon impact with objects liable to damage the bars.

7. Apparatus according to claim 6 in which the bars of each of the second and third rotary members are mounted in mounting elements distributed along the axis of the member, the bars being mounted in slots in the mounting elements which allow movement of the bars towards and away from the axis of rotation of the member, the arrangement being such that in operation upon rotation of the rotary member centrifugal force urges the bars outwardly along the slots to assume a normal operating position in which the bars define the said virtual cylindrical surface.

8. Apparatus according to claim 6 in which the bars are biassed towards a normal operating position by a resilient biassing means.

9. Apparatus according to claim 1 in which the first member has a continuous substantially uniform surface forming the said first surface.

10. Apparatus according to claim 1 in which the driving means is adapted to drive the first rotary member in a rotary reciprocatory motion having an amplitude in the range 20° to 120°.

11. Apparatus according to claim 10 in which the driving means is adapted to drive the first rotary member in a reciprocatory motion having an amplitude in the range 20° to 90°.

12. Apparatus according to claim 11 in which the diameters of the second and third surfaces are the same, and the diameter of the first surface is in the range one fifth to three fifths fraction of the diameter of the second and third surfaces.

13. Apparatus according to claim 1 in which the upper portions of the three generally cylindrical surfaces lie substantially in a single plane.

14. Apparatus according to claim 1 in which the frequency of rotation of the second member is the same as the frequency of rotation of the third member and is in the range 200 to 400 revs. per minute, the frequency of reciprocation of the first surface differing from the frequency of rotation of the second and third members by an amount up to 10% of the frequency of the second and third members.

15. Apparatus for cleaning objects comprising:
a first member;
a second member, said first and second members defining a discharge aperture for the discharge of dirt removed from the objects, said discharge aperture being smaller in size than the objects being cleaned;
first and second surfaces defined by the first and second members respectively for cleaning objects by relative movement between the surfaces and the objects to be cleaned;
a frame for mounting said first and second members with the first and second surfaces converging towards each other over at least a part of the extent of each surface; and
driving means for driving the first member in a reciprocatory movement such that, in the vicinity of the convergence of the surfaces, said first surface moves in a reciprocatory movement towards and away from said region of convergence along a path lying substantially in said first surface itself and for driving the second member in a motion such as to effect at least an average movement of said second surface towards the region of convergence of the surfaces.

16. Apparatus according to claim 15 in which the second member is a rotary member defining the second surface in the general form of a cylinder, and the driving means includes means for driving the second member in a rotary motion.

17. Apparatus according to claim 16 in which the driving means includes means for driving the second member in a continuous rotary motion in a single sense of rotation.

18. Apparatus according to claim 16 in which the first member is a rotary member defining the first surface in the general form of a cylinder, and the driving means includes means for driving the first member in a rotary reciprocatory motion.

19. Apparatus according to claim 18 in which the first and second rotary members are positioned generally side by side with the axes of rotation thereof substantially parallel.

20. Apparatus according to claim 19 in which the axis of the first rotary member is at a higher level than the axis of the second rotary member.

21. Apparatus according to claim 17 in which the first surface is in the general form of a cylinder having a smaller diameter than that of the second surface.

22. Apparatus according to claim 15 in which at least one of the members includes spaces for passage of dirt through the surface of the member.

23. Apparatus according to claim 15 in which the driving means drives said first member in a substantially linear reciprocatory motion.

24. Apparatus according to claim 15 in which there is provided means for urging the objects to be cleaned along said second surface.

25. Apparatus according to claim 24 in which there is provided means for urging the objects to be cleaned along the surfaces in a direction transverse to the direction of movement of said second surface.

26. Apparatus for cleaning objects comprising:
a first member;
a second member, said first and second members defining a discharge aperture for the discharge of dirt removed from the objects, said discharge aperture being smaller in size than the objects being cleaned; said first and second members defining first and second surfaces respectively for cleaning objects by relative movement between the surfaces and the objects to be cleaned;

a frame for mounting said first and second members with the first and second surfaces converging towards each other over at least a part of the extent of each surface;

driving means for driving the first member in a reciprocatory movement such that, in the vicinity of the convergence of the surfaces, said first surface moves in a reciprocatory movement towards and away from said region of convergence along a path lying substantially in said first surface itself and for driving the second member in a motion such as to effect at least an average movement of said second surface towards the region of convergence of the surfaces; and said second member being a rotary member defining said second surface in the general form of a cylinder and said driving means including means for driving said second member in a rotary motion, said second surface being a virtual surface defined by a grid of spaced apart bars for the passage of dirt through said member, said bars comprising longitudinal bars running along the length of said second member generally parallel to its axis of rotation.

27. The apparatus according to claim 26 in which said bars are yieldably mounted in such a manner as to be deflectable from a normal operating position upon impact with objects liable to damage the bars.

28. Apparatus for cleaning objects comprising:

a first member;

a second member, said first and second members defining a discharge aperture for the discharge of dirt removed from the objects, said discharge aperture being smaller in size than the objects being cleaned;

first and second surfaces defined by the first and second members respectively for cleaning objects by relative movement between the surfaces and the objects to be cleaned;

a frame for mounting said first and second members with the first and second surfaces converging towards each other over at least a part of the extent of each surface;

driving means for driving the first member in a reciprocatory movement such that, in the vicinity of the convergence of the surfaces, said first surface moves in a reciprocatory movement towards and away from said region of convergence along a path lying substantially in said first surface itself and for driving the second member in a motion such as to effect at least an average movement of said second surface towards the region of convergence of the surfaces; and said apparatus further including means for urging the objects to be cleaned along said second surface.

29. The apparatus as claimed in claim 28 in which there is provided means for urging the objects to be cleaned along the surfaces in a direction transverse to the direction of movement of the second surface.

* * * * *